United States Patent [19]

Damratowski

[11] 4,398,694

[45] Aug. 16, 1983

[54] IRRIGATION PIPE GATE

[75] Inventor: Harold E. Damratowski, Alda, Nebr.

[73] Assignee: Triad Corporation, Alda, Nebr.

[21] Appl. No.: 257,207

[22] Filed: Apr. 24, 1981

[51] Int. Cl.³ .............................................. F16K 3/22
[52] U.S. Cl. ................................................... 251/145
[58] Field of Search ................................ 251/145, 146

[56] References Cited

U.S. PATENT DOCUMENTS

| | | | |
|---|---|---|---|
| 2,647,539 | 8/1953 | Stearns | 251/145 |
| 2,784,558 | 3/1957 | Hohnstein | 251/145 |
| 2,918,251 | 12/1959 | Epp | 251/145 |
| 3,327,990 | 6/1967 | Hohnstein | 251/145 |
| 3,455,533 | 7/1969 | Epp | 251/145 |
| 3,539,149 | 11/1970 | Sebreny | 251/145 |
| 3,598,362 | 8/1971 | Heldemonn | 251/145 |
| 3,989,224 | 11/1976 | Kroeker | 251/145 |
| 4,169,577 | 10/1979 | Domratroski et al. | 251/145 |

Primary Examiner—A. Michael Chambers
Attorney, Agent, or Firm—Frost & Jacobs

[57] ABSTRACT

A three member longitudinally slidable irrigation pipe gate for opening and closing an outlet port in a cylindrical irrigation pipe. The gate includes a base member slidingly abutting the inside wall surface of the irrigation pipe, a cover member slidingly abutting the outside wall surface of the pipe, and a U-shaped resilient spring disjointed from the base and cover members and securing them together to form an integral pipe gate structure. The spring is constructed from a resilient glass fiber filled acetal plastic to facilitate disassembly and repair of the pipe gate.

17 Claims, 7 Drawing Figures

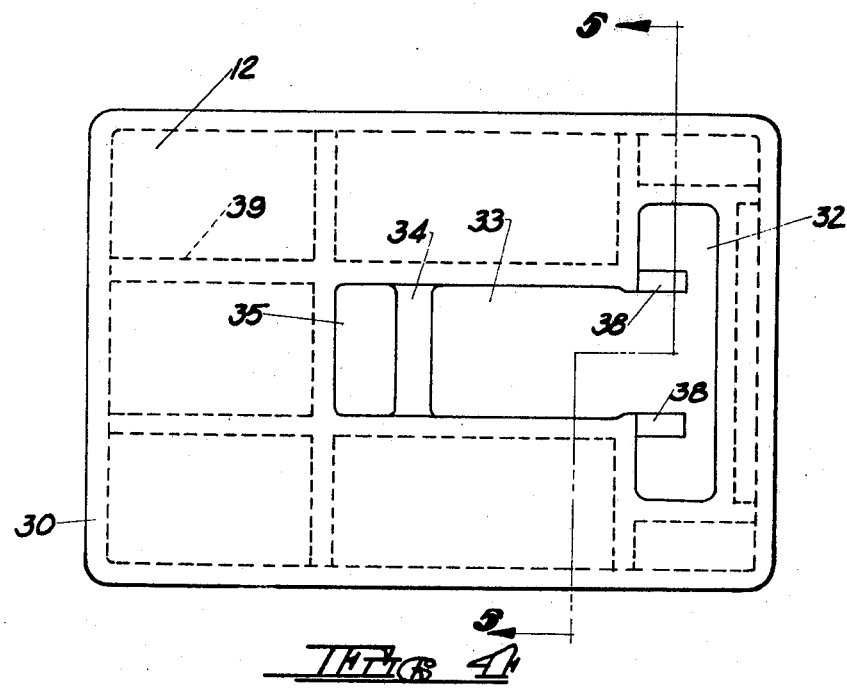
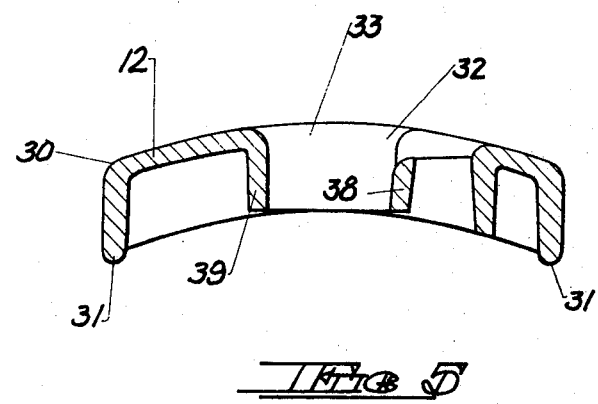

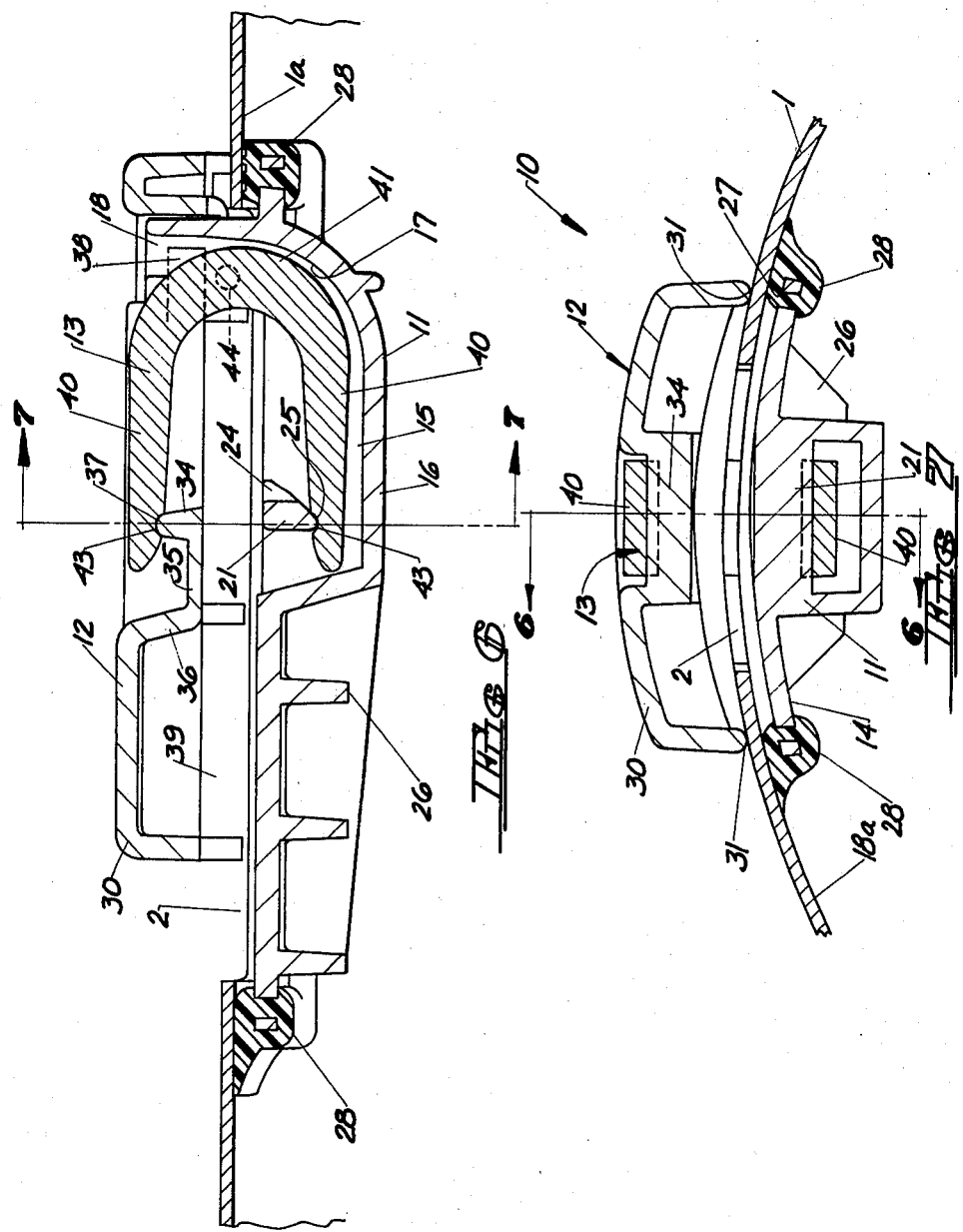

IRRIGATION PIPE GATE

SUMMARY OF THE INVENTION

The present invention is directed to a slidable irrigation pipe gate, and more particularly to a three element pipe gate having a removable horseshoe-shaped keeper or spring.

It is common to use a longitudinally slidable gate valve for opening and closing the outlet port in a cylindrical water irrigation pipe. With such gates, a worker can very quickly move along a length of irrigation pipe and successively open or close a plurality of the spaced gates in order to irrigate a particular area.

Various arrangements have been suggested for constructing such gates, among them the three piece gate illustrated in U.S. Pat. No. 4,169,577 issued Oct. 2, 1979 to H. E. Damratowski et al. As disclosed therein, the irrigation pipe gate includes inner and outer plates which are secured together by an elongated leaf spring. Such construction facilitates the installation of the gate on the irrigation pipe, and also permits the gate to be easily replaced or repaired. By moving the gate in one direction, the outlet port of the irrigation pipe is exposed. By moving the gate longitudinally in the opposite direction, the outlet port may be completely or partially closed.

The present invention is directed to an irrigation pipe gate of the three element variety. Specifically, the invention is directed to a longitudinally slidable irrigation pipe gate for opening and closing a longitudinally elongated outlet port extending through the wall of a generally cylindrical water-carrying irrigation pipe. The gate includes a base member comprising an inner plate for slidingly abutting against the inner wall surface of the irrigation pipe with longitudinal and transverse dimensions exceeding those of the outlet port. The central portion of the plate forms a depression having a lower portion extending longitudinally forwardly from the rearward end of the gate. A channel-shaped boss spans the depression and is attached to the rearward end of the base member, with the boss being dimensioned to extend upwardly through the pipe opening. A transversely extending lower cross bar having a rounded lower edge bridges the depression in overlying relationship with the floor portion. A resilient annular gasket is attached around the periphery of the inner plate for providing a water tight slidable seal between the inner plate and the inside surface of the pipe.

The gate also includes a cover member comprising an outer plate having longitudinally extending edges for slidingly abutting the outer surface of the pipe. The cover member includes a transversely extending opening for non-rotatably receiving the base member boss and an opening extending longitudinally forwardly from the medial portion of the transverse opening. A transversely extending upper cross bar having a rounded upper edge bridges the longitudinal opening such that the upper cross bar is positioned in spaced overlying relationship with the lower cross bar when the base and cover members are assembled to the irrigation pipe.

The base member and the cover member are connected together by spring means which are physically disjointed from the base and cover members, which operates to urge them toward the inside surface and outside surface, respectively, of the intervening pipe wall. The spring means is readily insertable for assembly of the pipe gate and is similarly readily removable for disassembly of the pipe gate. In the preferred embodiment illustrated, the spring means comprises a horseshoe or U-shaped spring molded from a resilient glass-fiber filled acetal plastic material and includes a pair of spaced parallel arms connected by an arcuate portion. Each of the arms terminates on its inner surface in a rounded notch or groove. A spherical-shaped detent also projects outwardly from each of the side edges of the arcuate portion of the spring.

One arm of the spring is insertable through the transversely extending opening of the cover member and the boss of the base member when the base and cover members are assembled on the irrigation pipe such that the arm lies within the depression within the notched portion and engages the lower edge of the lower cross bar. The other arm of the spring is disposed within the transversely extending opening of the cover member with the notched portion engaging the upper edge of the upper cross bar, so that the resilient spring urges the cross bars and consequently the cover and base members together. The leafs projecting inwardly from the elongated transversely extending opening of the cover member engage the adjacent detents to further secure the spring in place.

The pipe gate includes a closed rearward position where the base member and gasket cover the outlet port and an opened forward position where a portion of the outlet port is not covered by the base member and gasket.

Further features of the invention will become apparent from the detailed description which follows.

BRIEF DESCRIPTION OF THE DRAWING

FIG. 4 is a top plan view of the cover member of the irrigation pipe gate of the present invention.

FIG. 5 is a cross sectional view taken along section line 5—5 of FIG. 4.

FIG. 6 is a fragmentary cross sectional view taken along section line 7—7 with the irrigation pipe gate of the present invention in place on an irrigation pipe.

FIG. 7 is a fragmentary cross sectional view taken along section line 6—6 of the irrigation pipe gate of the present invention in place on an irrigation pipe.

DETAILED DESCRIPTION

Figure 1:
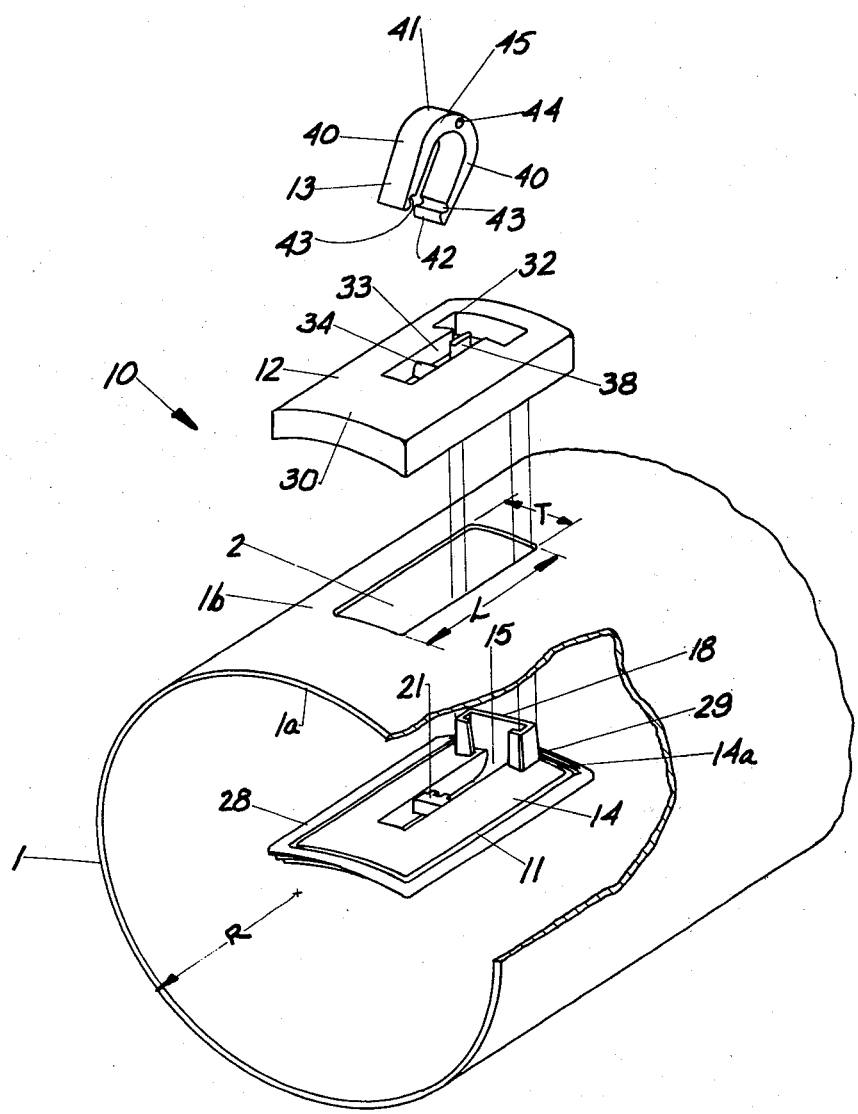
FIG. 1 is a fragmentary cut-away perspective exploded view of the irrigation pipe gate of the present invention in connection with an irrigation pipe.

FIG. 1 illustrates a perspective view of a typical cylindrical thin walled tubular irrigation pipe 1 which may be fabricated from metal, plastic, concrete or the like, and which has a nominal radius R. In a typical irrigation system, pipe 1 will include a plurality of spaced openings or outlet ports, one of which is illustrated as a longitudinally elongated outlet port 2 in FIG. 1. Outlet port 2 is of generally rectangular shape, and is defined by a longitudinally extending dimension L, and a shorter transversely extending dimension T.

The irrigation pipe gate of the present invention is illustrated generally at 10 and comprises three interconnecting components: a base member 11 positioned on the interior of the irrigation pipe 1, a cover member 12 positioned on the exterior of the irrigation pipe, and a horseshoe or U-shaped spring 13 physically disjointed from the base and cover members which operates to connect the base member and cover members together so as to urge them toward the inside and ouside surfaces, respectively, of the intervening irrigation pipe wall. When connected together as will be described in more detail hereinafter, the base member 11 and cover member 12 form the longitudinally slidable irrigation pipe gate 10 having a closed position where the base member 11 covers outlet port 2 to prevent discharge of water therefrom, and an opened position where a portion of the outlet port 2 is not covered by the base member 11 to permit discharge of water from the irrigation pipe.

Figure 2:
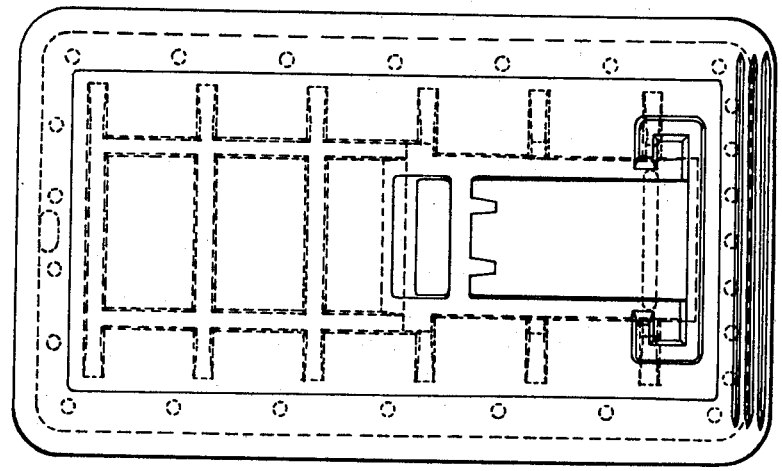
FIG. 2 is a top plan view of the base member of the irrigation pipe gate of the present invention.
Figure 3:
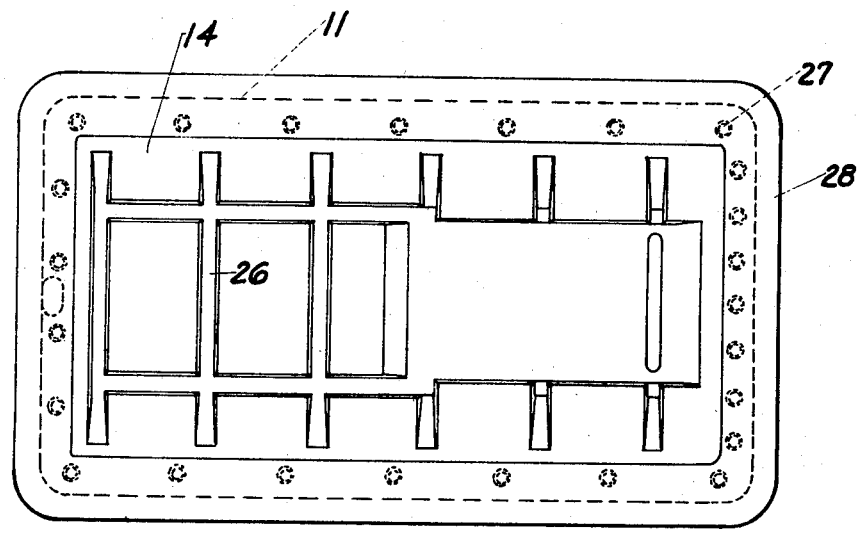
FIG. 3 is a bottom plan view of the base member of the irrigation pipe gate of the present invention.

As best shown in FIG. 2 and FIG. 3, base member 11 comprises a rectangular inner plate 14 of arcuate transverse cross section as illustrated in FIG. 7, for slidingly abutting against the inner wall surface 1a of irrigation pipe 1. The respective longitudinal and transverse dimensions of inner plate 14 are selected to exceed those of outlet port 2.

The central portion of inner plate 14 forms a depression or concavity 15 which extends longitudinally forwardly from the rearward end 14a of inner plate 14. The lowermost section of concavity 15 forms a generally planar floor portion 16 which extends arcuately rearwardly and upwardly, thereby forming a ramp-like surface 17 on the inner surface of concavity 15.

A channel-shaped boss 18 of C-shaped cross section spans the rearwardmost end of concavity 15, and extends perpendicularly upwardly from the rear end 14a of inner plate 14. Boss 18 includes a pair of spaced parallel longitudinally extending forwardly directed arms 19 terminating at their forward ends in inwardly directed flange portions 20. It will be observed that the central portion or channel of boss 18 communicates with concavity 15.

A lower cross bar 21 extends transversely across concavity 15 so as to form a generally rectangular forward opening 22 between lower cross bar 21 and the forward portion of inner plate 14, and a generally rectangular rear opening between lower cross bar 21 and boss 18. Lower cross bar 21 includes a pair of spaced rearwardly directed ribs 24, and a generally rounded lower edge (see FIG. 6) positioned in spaced relationship with the floor portion 16 of concavity 15.

As best seen in FIG. 3, the lower surface of inner plate 14 is provided with a plurality of intersecting longitudinally and transversely extending ribs, one of which is shown at 26, which impart additional structural rigidity to the base member.

The peripheral edge of inner plate 14 is provided with a plurality of spaced openings, one of which is illustrated at 27, extending completely through the edge of the inner plate. These openings assist in securing a resilient annular gasket 28 along the periphery of the inner plate for providing a water tight slidable seal between the inner plate and the inside surface of the irrigation pipe. In general, gasket 28 will be fabricated from a more compressive material than that of the inner plate. The rearward upper surface of gasket 28 is provided with a plurality of transversely extending ridges, one of which is shown at 29, which prevent roll-up of the gasket as the gate 10 is being longitudinally slidably opened and closed. Furthermore, the forward and longitudinal gasket edges are of feathered shape to accommodate a range of differently sized irrigation pipes and wall irregularities. Consequently, a single pipe gate 10 may be used over a wide range of irrigation pipe sizes.

Cover member 12 comprises an outer plate 30 having a pair of spaced parallel longitudinally extending edges 31 for slidingly abutting the outside wall surface 1b of irrigation pipe 1 adjacent outlet port 2. Outer plate 30 includes a transversely extending opening 32 dimensioned to non-rotatably receive boss 18 of base member 11. A generally rectangular opening 33 extends longitudinally forwardly from the medial portion of transverse opening 32 a distance approximately equal to the length of concavity 15.

An upper cross bar 34 extends transversely across the forward portion of longitudinally extending opening 33. It will be observed that upper cross bar 34 is connected to the vertical wall surfaces forming opening 33, and by means of a web portion 35 to the vertical end wall surface 36 of opening 33. The upper edge 37 of upper cross bar 34 is rounded as best shown in FIG. 6. It will be observed that upper cross bar 34 is positioned in generally overlying spaced relationship with lower cross bar 21 when the base member and cover member are secured to the irrigation pipe.

A tab-like leaf member 38 extends rearwardly from each side wall of longitudinally extending opening 33 into transverse opening 32. As will be described in more detail hereinafter, leaf members 38 cooperate to hold U-shaped spring 13 in place.

A plurality of intersecting longitudinally and transversely extending ribs or gussets, one of which is shown at 39, are also provided on the lower surface of outer plate 30 to strengthen the entire structure. As best shown in FIG. 5, outer plate 30 is of generally arcuate shape so as to conform to the outside surface of a range of irrigation pipe sizes.

Base member 11 and cover member 12 are held together in overlying relationship to the inside and outside surfaces, resepectively, of irrigation pipe 1 by means of a horseshoe or U-shaped spring which is physically disjointed from the base and cover members. Spring 13 operates to urge the base and cover members toward the inside surface and outside surface, respectively, of the intervening pipe wall. As illustrated in FIG. 1, spring 13 comprises a U-shaped member of a somewhat resilient material, the spring preferably being molded from a resilient glass fiber filled acetal plastic material. Spring 13 includes a pair of spaced parallel arms 40 connected by an arcuate portion 41. The ends of spring arms 40 are rounded as at 42, and terminate in a transversely extending rounded groove or notch 43 configured to cooperate with the rounded edges of upper and lower cross bars 21 and 34, respectively. A concave spherical-shaped detent 44 projects outwardly from each of the side edges 45 of the arcuate portion 41 of spring 40. It will be understood that a detent 44 may be provided on one or both sides of spring 40 to assist in holding the spring against leaf members 38 of cover member 12.

In operation, base member 11 is inserted through outlet port 2 and turned so that the upper surface of inner plate 14 abuts the inside surface 1a of the irrigation pipe. Cover member 12 is then positioned on the outside of the pipe so that boss 18 extends through transverse opening 32. Spring 13 is then positioned at approximately a 45° angle as illustrated in FIG. 1, and lowered so that notch or groove 43 on the inside of the upper arm engages the rounded upper edge 37 of upper cross bar 34. Spring 13 is then pivoted downwardly with the lower arm 40 of the spring riding within concavity 15 along ramp-like surface 17 until the lower groove 43 snaps under the rounded lower edge 35 of lower cross bar 21 to secure the spring in place and urge the cover and base members toward each other. At the same time, detents 44 pass inwardly of leaf members 38, with the detents being positioned beneath the lower edge of leaf members 38 when the spring is fully seated as illustrated in FIG. 6. The force exerted by spring 13 in cooperation with resilient sealing gasket 28 provides a slidable waterproof seal between base member 11 and the inside surface 1a of the irrigation pipe. It will be further observed that resilient gasket 28 is adhered to the upper and lower surfaces of inner plate 14 along its entire periphery thereby maintaining the inner plate periphery a small distance away from the inside surface of the pipe.

The pipe gate may be slid rearwardly such that base member 11 completely covers outlet port 2 to prevent escape of water therefrom. Conversely, gate 10 may be slid forward to partially or completely expose the outlet port.

In a preferred embodiment, base member 11 and cover member 12 will be molded of a relatively inexpensive, relatively rigid plastic material, particularly a resinous material. Spring 13 may be molded from a glass fiber filled acelat plastic material in order to impart the necessary resiliency. In the event that extended use causes loss of tension of spring 13, it may be easily removed and replaced with a new spring, thus avoiding the necessity of having to replace the entire gate 10.

It will be understood that various changes in the details, materials, steps and arrangements of parts, which have been herein described and illustrated in order to explain the nature of the invention, may be made by those skilled in the art within the scope and principles as expressed in the appended claims.

The embodiments of the invention in which an exclusive property or privilege is claimed are as follows:

1. A slidable irrigation pipe gate for opening and closing an outlet port extending through the wall of a generally cylindrical irrigation pipe, said gate comprising:
   a base member comprising an inner plate for slidingly abutting against the inside wall surface of the irrigation pipe with longitudinal and transverse dimensions exceeding those of the outlet port;
   gasket means attached to said inner plate for providing a water tight slidable seal between the inner plate and the inside surface of the pipe;
   a cover member comprising an outer plate for slidingly abutting the outside surface of the pipe; and
   connecting means for connecting the base member and the cover member and urging them toward the inside surface and the outside surface, respectively, of the intervening pipe wall, said connecting means including upper and lower cross bar members attached to said cover and base members, respectively, and spring means readily insertable for assembly of the pipe gate and readily removable for disassembly of the pipe gate, said spring means comprising a U-shaped spring having a pair of spaced elongated generally parallel arms terminating in means configured to engage a corresponding one of said cross bar members to urge said base and cover members toward each other, said spring arms being connected by an arcuate portion,
the pipe gate having a closed position wherein the outlet port is covered and an open position wherein a portion of the outlet port is not covered.

2. The irrigation pipe gate according to claim 1 wherein the central portion of said inner plate forms a concavity having a lower floor portion, said cross bar bridging said depression in overlying relationship with said floor portion.

3. The irrigation pipe gate according to claim 2 wherein said engaging means of said spring comprises a notch-like groove and the lower edge of said lower cross bar is configured to engage said groove.

4. The irrigation pipe gate according to claim 1 including a channel-shaped boss attached to the rearward end of said base member and dimensioned to extend upwardly through the pipe opening, said cover member including an opening for non-rotatably receiving the base member boss.

5. The irrigation pipe gate according to claim 1 wherein said resilient gasket is adhered to the upper and lower surfaces of said inner plate along its entire periphery thereby maintaining the inner plate periphery a small distance away from the irrigation pipe inside surface.

6. The irrigation pipe gate according to claim 5 wherein the rearward and longitudinal portions of said gasket are of cross sectional shape feathered outwardly and upwardly from the periphery of the gasket to accommodate a range of size and wall irregularities of the irrigation pipe.

7. The irrigation pipe gate according to claim 1 wherein the leading portion of said gasket is provided with transversely extending ridges to prevent roll-up of the gasket as the gate is being opened and closed.

8. The irrigation pipe gate according to claim 1 wherein said outer plate includes longitudinally extending edges for slidably abutting the outer surface of the pipe.

9. The irrigation pipe gate according to claim 1 wherein said outer plate includes a longitudinally extending opening, said cross bar extending transversely across said opening.

10. The irrigation pipe gate according to claim 9 wherein said engaging means includes a notched groove on one of said spring arms, the lower edge of said upper cross bar being configured to engage said groove.

11. The irrigation pipe gate according to claim 10, said arcuate portion of said spring including a detent projecting outwardly from the side edge thereof, said longitudinal opening including a leaf configured to engage said detent when said spring is positioned to urge said base and cover members together to prevent dislodgement of said spring.

12. The irrigation pipe gate according to claim 1 including means for holding said spring in place when said spring is urging said base and cover members together.

13. A longitudinally slidable irrigation pipe gate for opening and closing a longitudinally elongated outlet port extending through the wall of a generally cylindrical irrigation pipe, said gate including a forward end and a rearward end and comprising:
   a base member including an inner plate for slidingly abutting against the inside wall surface of the irrigation pipe with longitudinal and transverse dimensions exceeding those of the outlet port, the central portion of said plate forming a concavity having a lower floor portion extending longitudinally forwardly from the rearward end of the gate, a channel-shaped boss spanning said depression and attached to the rearward end of said base member, said boss being dimensioned to extend upwardly through the pipe opening, and a transversely extending lower cross bar having a rounded lower edge bridging said depression in overlying relationship with said floor portion;

a resilient annular gasket attached along the periphery of the inner plate for providing a water tight slidable seal between the inner plate and the inside surface of the pipe;

a cover member comprising an outer plate having longitudinally extending edges for slidingly abutting the outside surface of the pipe, said cover member including a transversely extending opening for non-rotatably receiving the base member boss, an opening extending longitudinally forwardly from the medial portion of said transverse opening, a transversely extending upper cross bar having a rounded upper edge bridging said longitudinal opening such that said upper cross bar is positioned in spaced overlying relationship with said lower cross bar when the base and cover members are assembled to the irrigation pipe; and spring means physically disjointed from the base and cover members for connecting the base member and the cover member and urging them toward the inside surface and outside surface, respectively, of the intervening pipe wall, said spring means being readily insertable for assembly of the pipe gate and readily removable for disassembly of the pipe gate, said spring means comprising a U-shaped spring having a pair of spaced parallel arms connected by an arcuate portion, each of said arms terminating on their inner surfaces with facing rounded notches, one arm of said spring being insertable through the transversely extending opening of the cover member and the boss of the base member when said base and cover members are assembled on the irrigation pipe such that the arm lies within said concavity with the notched portion engaging the lower edge of the lower cross bar and said other arm is disposed within the transversely extending opening of the cover member with the notched portion engaging the upper edge of the upper cross bar, the pipe gate having a closed rearward position where the base member and gasket cover the outlet port and an open forward position where a portion of the outlet port is not covered by the base member and gasket.

14. The pipe gate according to claim 1 or 13 wherein said spring is molded from a resilient glass fiber filled acetal plastic material.

15. The pipe gate according to claim 13 including a detent projecting outwardly from one of the side edges of said arcuate spring portion and a web-shaped leaf extending inwardly from said transverse opening of said cover member, said leaf being configured to engage the adjacent detent to secure said spring in place.

16. The pipe gate according to claim 13 wherein said base member and said cover member are of generally arcuate transverse cross section to conform to the corresponding surfaces of the pipe gate.

17. The pipe gate according to claim 13 wherein said resilient gasket is adhered to the upper and lower surfaces of the inner plate along its entire periphery thereby maintaining the inner plate periphery a small distance away from the irrigation pipe inside surface.

* * * * *